United States Patent
Schmidt et al.

(10) Patent No.: US 11,092,687 B2
(45) Date of Patent: Aug. 17, 2021

(54) METHOD AND SYSTEM FOR POSITION CAPTURE

(71) Applicant: SEW-EURODRIVE GMBH & CO. KG, Bruchsal (DE)

(72) Inventors: Josef Schmidt, Graben-Neudorf (DE); Jürgen Böckle, Bruchsal (DE); Zhidong Hua, Bruchsal (DE); Thomas Schäfer, Karlsdorf-Neuthard (DE); Andreas Wanjek, Waghäusel (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 423 days.

(21) Appl. No.: 16/332,760

(22) PCT Filed: Jul. 14, 2017

(86) PCT No.: PCT/EP2017/025209
§ 371 (c)(1),
(2) Date: Mar. 12, 2019

(87) PCT Pub. No.: WO2018/046134
PCT Pub. Date: Mar. 15, 2018

(65) Prior Publication Data
US 2019/0361115 A1    Nov. 28, 2019

(30) Foreign Application Priority Data
Sep. 12, 2016    (DE) ............... 10 2016 010 878.9

(51) Int. Cl.
*G01S 13/931* (2020.01)
*G01S 13/86* (2006.01)
(Continued)

(52) U.S. Cl.
CPC ............ *G01S 13/931* (2013.01); *G01S 13/86* (2013.01); *G01S 13/89* (2013.01); *G05D 1/0231* (2013.01); *G05D 2201/0213* (2013.01)

(58) Field of Classification Search
CPC ...... G01S 13/931; G01S 13/89; G01S 13/867; G01S 13/865; G01S 13/86;
(Continued)

(56) References Cited

U.S. PATENT DOCUMENTS 3,008,532 A * 11/1961 Reed .................... G05D 1/0265
                                                      180/168
4,284,941 A *  8/1981 Regueiro ............. G05D 1/0265
                                                      180/168
(Continued)

FOREIGN PATENT DOCUMENTS

DE    4312434 A1    9/1994
DE    10008289 A1   9/2001
(Continued)

OTHER PUBLICATIONS

International Preliminary Report on Patentability issued in International Patent Application No. PCT/EP2017/025209, dated Mar. 21, 2019 (8 pages).
(Continued)

*Primary Examiner* — Peter M Bythrow
(74) *Attorney, Agent, or Firm* — Carter, DeLuca & Farrell LLP (57) ABSTRACT

In a method and system for position capture of a vehicle along a driving route, situated on a concrete floor having a reinforcement: the vehicle carries out a reference drive along the driving route, the vehicle records measuring points along the driving route, and each measuring point allocates a signal from the reinforcement to a position on the driving route; a reference profile of the driving route is determined (Continued)

based on the measuring points ascertained during the reference drive; the vehicle drives along the driving route and records further measuring points; a profile segment is determined from the further measuring points; the profile segment is uniquely allocated to a segment of the reference profile, e.g., using a correlation method; a position on the driving route is uniquely allocated to the vehicle with the aid of the profile segment allocated to the reference profile.

28 Claims, 6 Drawing Sheets

(51) Int. Cl.
  *G01S 13/89* (2006.01)
  *G05D 1/02* (2020.01)

(58) Field of Classification Search
  CPC .... G05D 2201/0213; G08G 1/00; G08G 1/02; G08G 1/04; G08G 1/042; G08G 1/123; B61L 15/0072; B61L 3/002; B61L 3/02
  See application file for complete search history.

(56) References Cited

U.S. PATENT DOCUMENTS

| | | | | |
|---|---|---|---|---|
| 5,128,669 A * | 7/1992 | Dadds | G01S 13/765 340/901 |
| 5,192,954 A * | 3/1993 | Brockelsby | G07C 9/28 342/42 |
| 5,196,846 A * | 3/1993 | Brockelsby | B61L 25/04 340/10.51 |
| 5,216,605 A * | 6/1993 | Yardley | G05D 1/0261 180/168 |
| 5,245,335 A * | 9/1993 | Hill | G05D 1/0265 180/168 |
| 5,289,183 A * | 2/1994 | Hassett | G01S 13/765 340/905 |
| 5,310,999 A * | 5/1994 | Claus | G01S 13/751 235/384 |
| 5,420,794 A * | 5/1995 | James | G08G 1/096716 340/932 |
| 5,477,217 A * | 12/1995 | Bergan | G08G 1/02 340/933 |
| 5,524,723 A * | 6/1996 | Gramling | G05D 1/0265 104/286 |
| 5,705,996 A * | 1/1998 | Eguchi | G07B 15/063 340/928 |
| 5,777,451 A * | 7/1998 | Kobayashi | G08G 1/166 318/587 |
| 5,784,005 A * | 7/1998 | Akutsu | G08B 25/016 340/905 |
| 5,818,356 A * | 10/1998 | Schuessler | G08G 1/096861 340/995.12 |
| 5,893,043 A * | 4/1999 | Moehlenbrink | B61L 25/021 701/446 |
| 6,122,573 A * | 9/2000 | Higashi | G05D 1/0261 180/167 |
| 6,138,064 A * | 10/2000 | Matsumoto | B61L 23/34 318/587 |
| 6,219,613 B1 * | 4/2001 | Terrier | G01S 13/74 342/42 |
| 6,329,932 B1 * | 12/2001 | Fastenrath | G08G 1/0104 340/934 |
| 6,758,089 B2 * | 7/2004 | Breed | G07C 5/008 340/901 |
| 6,900,740 B2 * | 5/2005 | Bloomquist | G08G 1/096716 340/905 |
| 6,967,592 B2 * | 11/2005 | Bell | G08G 1/0104 340/905 |
| 6,971,464 B2 * | 12/2005 | Marino | B60T 7/16 180/167 |
| 7,002,486 B2 * | 2/2006 | Lawrence | G08G 1/01 340/439 |
| 7,578,485 B1 * | 8/2009 | Ohmstede | B61L 23/34 246/122 R |
| 8,301,374 B2 * | 10/2012 | Surampudi | G01C 21/30 701/438 |
| 8,344,906 B2 * | 1/2013 | Emam | G08G 1/096783 340/905 |
| 8,384,560 B2 * | 2/2013 | Malarky | G08G 1/0175 340/928 |
| 8,924,066 B2 * | 12/2014 | Fries | B61L 27/0077 701/23 |
| 9,070,064 B2 * | 6/2015 | Smith | G08G 1/095 |
| 9,651,659 B2 * | 5/2017 | Vinski | G08G 1/0116 |
| 9,810,531 B2 * | 11/2017 | Hua | G01B 11/00 |
| 10,712,748 B2 * | 7/2020 | Smartt | G05D 1/0295 |
| 2008/0204278 A1 * | 8/2008 | Tsuzuki | G07B 15/063 340/928 |
| 2008/0300776 A1 * | 12/2008 | Petrisor | G08G 1/0112 701/118 |
| 2009/0231161 A1 * | 9/2009 | Malarky | G07B 15/063 340/933 |
| 2010/0052971 A1 * | 3/2010 | Amarillas | G01S 13/862 342/22 |
| 2010/0123558 A1 * | 5/2010 | Park | G08G 1/052 340/10.4 |
| 2011/0125350 A1 * | 5/2011 | Won | B61L 15/0072 701/20 |
| 2011/0153201 A1 * | 6/2011 | Park | G01C 21/20 701/533 |
| 2012/0173055 A1 * | 7/2012 | Yamamoto | B61L 25/026 701/20 |
| 2015/0054675 A1 * | 2/2015 | Vinski | G01S 13/74 342/43 |
| 2015/0358080 A1 * | 12/2015 | Hua | H04L 7/0075 398/107 |
| 2018/0037242 A1 * | 2/2018 | Haedicke | B61L 25/025 |
| 2018/0164157 A1 * | 6/2018 | Pedersen | G01S 19/01 |

FOREIGN PATENT DOCUMENTS

| | | | |
|---|---|---|---|
| DE | 102013001358 A1 | 7/2014 |
| WO | WO1991009356 A1 | 6/1991 |
| WO | WO 2014065856 A1 | 5/2014 |

OTHER PUBLICATIONS

International Search Report dated Sep. 15, 2017, in International Application No. PCT/EP2017/025209 (English-language translation).

\* cited by examiner

Fig. 1

Fig. 3

METHOD AND SYSTEM FOR POSITION CAPTURE

FIELD OF THE INVENTION

The present invention relates to a method and a system for capturing a position.

BACKGROUND INFORMATION

German Published Patent Application No. 10 2005 008 555 describes a system and a method for determining a position.

A vehicle localization using ground-directed radar is described in PCT Published Patent Application No. WO 2014/065856.

U.S. Patent Application Publication No. 2010/0052971 describes a radar-based detection of a roadway.

A method for operating a system using light communication is described in German Published Patent Application No. 10 2013 001 358.

German Published Patent Application No. 100 08 289 describes a method for determining the orientation of a mobile component.

SUMMARY

Example embodiments of the present invention provide a method and a system for position capture while providing better environmental protection.

According to an example embodiment of the present invention, a method for capturing a position of a vehicle along a driving route, the driving route being located on a concrete floor, the concrete floor having a reinforcement, includes: a first method step, in which the vehicle carries out a reference drive along the driving route, and the vehicle records measuring points along the driving route, each measuring point allocating a signal of the reinforcement to a position on the driving route, a second method step, in which a reference profile of the driving route is determined based on the measuring points ascertained during the reference drive, a third method step, in which the vehicle drives along the driving route and records further measuring points, a fourth method step, in which a profile segment is determined from the further measuring points, a fifth method step, in which the profile segment is uniquely allocated to a segment of the reference profile, in particular with the aid of a correlation method, and a sixth method step, in which a position on the driving route is uniquely allocated to the vehicle using the profile segment allocated to the reference profile.

This has the advantage that it is possible to determine the position of the vehicle along the driving route. For example, the reinforcement in the concrete floor which is typically provided in the concrete floor of a plant, in particular a fabric hall, may be used for this purpose. Thus, the vehicle only needs to be equipped with a sensor for detecting the measuring points and with an evaluation device for evaluating the measuring points. A reliable determination of the position of the vehicle on the driving route is therefore able to be carried out at a low outlay in terms of material.

In particular, the profile segment is uniquely allocated to the segment of the reference profile with the aid of a correlation method. In other words, the integral of the product between the profile segment and the segment of the reference profile displaced by a displacement amount in relation thereto is determined in the process. The value of the integral therefore depends on the amount of the displacement. The unique allocation is easily accomplished by determining the particular displacement amount at which the value of the integral has its maximum. An evaluation device of the vehicle is suitably configured for this allocation by determining the maximum of a correlation integral.

In example embodiments, in the sixth method step, a position range of the reference profile is allocated to the profile segment and the position of the vehicle relative to the profile segment is determined, the position of the vehicle on the driving route being determined based on the position range and the position of the vehicle relative to the profile segment. This offers the advantage that the position of the vehicle is able to be determined in an unambiguous manner.

In example embodiments, in order to determine the signal of the reinforcement, the depth and/or the density and/or the thickness of the reinforcement in the concrete floor is/are determined with the aid of a radar measurement and/or an inductive sensor. This offers the advantage that the usually provided reinforcement in the concrete floor may be used for determining the position of the vehicle on the driving route. The reinforcement may be disposed in an irregular pattern in the concrete floor, and the reinforcement especially has a plurality of reinforcement sections that partially overlap. As a result, the driving route has a characteristic reference profile so that a deviation of the vehicle from the driving route is detectable.

In example embodiments, the reference profile uniquely allocates a value of the signal of the reinforcement to each position along the driving route. This is considered advantageous insofar as the position of the vehicle on the driving route is able to be determined with the aid of the reference profile.

In example embodiments, the orientation of the vehicle is determined relative to the extension direction of the driving route at a position; in a first measurement, linearly polarized light from a stationary transmit module passes through a liquid crystal that is controlled such that the polarization of the light is rotated by a first angle, the light at least partially passing through a second polarization filter of the vehicle and intensity $I_1$ of the light being determined; and in a second measurement, linearly polarized light of the stationary transmit module passes through the liquid crystal that is controlled such that the polarization of the light is rotated by a second angle, the light at least partially passing through the second polarization filter and intensity $I_2$ of the light being determined, and intensities $I_1$ and $I_2$ being used to determine the orientation of the vehicle relative to the extension direction of the driving route, the first angle and the second angle being unequal, the first angle and the second angle in particular differing in their amounts by 90° or differing by a value of between 80° and 100° in terms of their amounts. This offers the advantage that the driving direction of the vehicle is able to be corrected using the instantaneous orientation before the vehicle deviates from the driving route. A reliable control of the vehicle is therefore possible.

According to an example embodiment of the present invention, in a system for the position capture of a vehicle along a driving route, in particular with the aid of a method for capturing a position as previously described, the system has the vehicle, the driving route, and a concrete floor, the driving route being located on the concrete floor, the concrete floor has a reinforcement, the vehicle has a sensor for measuring a signal of the reinforcement, and an evaluation device.

This has the advantage that the position of the vehicle along the driving route is able to be determined. For example, the reinforcement in the concrete floor which is normally provided in the concrete floor of a plant, in particular a factory hall, may be used for this purpose. As a result, only the sensor for detecting the measuring points and the evaluation device for evaluating the measuring points need to be installed in the vehicle. A reliable determination of the position of the vehicle on the driving route is therefore able to be carried out at a low outlay in terms of material.

In example embodiments, the sensor is disposed on a vehicle floor of the vehicle. This has the advantage that the clearance between the vehicle and the concrete floor is smaller than in a placement of the sensor in other positions on the vehicle. As a result, a satisfactory signal-to-noise ratio is therefore achievable when determining the signal from the reinforcement. For example, only air is located between the sensor and the concrete floor.

In example embodiments, the sensor is connected to the evaluation device, in particular connected in an electrically conductive manner. This is considered advantageous insofar as the evaluation device means is adapted to evaluate the signals from the sensor.

In example embodiments, the sensor is a radar sensor and/or an inductive sensor, which is/are adapted to determine the thickness and/or the density and/or the depth of the reinforcement in the concrete floor. This has the advantage that the characteristic reference profile of the reinforcement on the driving route is able to be determined with the aid of the sensor.

In example embodiments, the vehicle has a vehicle control, and the vehicle is particularly arranged as a driverless transport vehicle, the vehicle control being connected to the evaluation device. This has the advantage that the signals from the reinforcement are able to be evaluated by the vehicle and the position of the vehicle may be determined by the vehicle and this position may be used for the autonomous control of the vehicle.

In example embodiments, the system has stationary transmit modules, which are disposed along the driving route, in particular above the vehicle, the vehicle having a receive module, which particularly is situated on the topside of the vehicle, and each transmit module has a light source, in particular a light-emitting diode, and a first polarization filter, the first polarization filter being arranged as a linear polarization filter so that linearly polarized light is able to be emitted by the transmit module; the receive module has a light sensor, a liquid crystal, a control device for the liquid crystal, and a second polarization filter, the second polarization filter being arranged as a linear polarization filter and situated between the light sensor and the liquid crystal, and the liquid crystal is controllable with the aid of the control device such that the polarization of the linearly polarized light that passes through the liquid crystal is rotated by a first angle or at a second angle, in particular by 0° or at 90°, the first angle and the second angle being unequal, and light from the light source that has passed through the first polarization filter, then through the liquid crystal and then the second polarization filter, is detectable with the aid of the light sensor. This is considered advantageous insofar as the driving direction of the vehicle is able to be corrected with the aid of the instantaneous orientation before the vehicle deviates from the driving route. A reliable control of the vehicle is therefore possible.

In example embodiments, the light source generates intensity-modulated light, in particular having a frequency of between 100 kHz and 10 MHz. This offers the advantage that an item of identity information of the transmit module and/or a control command and/or an item of status information is/are able to be modulated onto the light. A high data-transmission rate is possible. The modulation of the light is invisible to the human eye.

In example embodiments, the light is visible light or infrared light. This offers the advantage that the light may be used for illuminating the driving route. Simple light sensors are able to be used, such as a photodiode or a phototransistor. Simple light sources such as a light-emitting diode are usable.

In example embodiments, the receive module has a receiver, which is connected to the evaluation device, and the receiver is adapted to measure a signal of the light sensor, in particular a current; the evaluation device is adapted to determine the orientation of the vehicle relative to the extension direction of the driving route using two measured values of the light sensor, the vehicle control in particular being adapted to use the orientation of the vehicle determined by the evaluation device for the control of the vehicle. This offers the advantage that the vehicle is controllable in an autonomous manner.

In example embodiments, each stationary transmit module has an item of identity information, which is able to be modulated onto the light of the respective stationary transmit module; with the aid of the identity information, a position range along the driving route is able to be uniquely allocated to each stationary transmit module, the system in particular having a memory unit in which the respective position ranges are stored together with an allocation to the respective identity information, the memory unit being able to be read out by the respective evaluation device. This has the advantage that it is possible to uniquely allocate the orientation and the position range to the vehicle. This makes it possible to carry out a redundant position determination of the vehicle. The very precise position determination with the aid of the signals from the reinforcement is able to be monitored by the determination of position ranges. As soon as a deviation occurs between the very precise position and the position range, a safety action is able to be carried out, e.g., stopping of the vehicle.

In example embodiments, each stationary transmit module has a respective transmit cone. This is considered advantageous insofar as it is possible to uniquely allocate the position range of a respective stationary transmit module to the vehicle as soon as the vehicle is present in the respective transmit cone of the individual stationary transmit module and detects its light.

In example embodiments, the transmit cones of adjacently disposed stationary transmit modules overlap at least partially. This offers the advantage that the spatial resolution in the position determination is improved. For example, the vehicle is located in a first position range in the transmit cone of a first stationary transmit module or in a second position range in the transmit cone of a second stationary transmit module or in a third position range in the transmit cone of the first stationary transmit module and in the transmit cone of the second stationary transmit module, the first stationary transmit module and the second stationary transmit module being adjacent. For example, the first position range, the second position range, and the third position range are smaller than the position range that is allocated to a respective stationary transmit module. The third position range is the overlap from the position range of the first stationary transmit module and the position range of the second stationary transmit module.

In example embodiments, the entire driving route is illuminated with the aid of the stationary transmit modules, in particular as an illumination of the driving route. This has the advantage that it is possible to allocate a position range to the vehicle along the entire driving route with the aid of the system.

In example embodiments, the system has a respective stationary receive module which is allocated to the respective stationary transmit module, the stationary receive module and the receive module of the vehicle being of the same type; and the vehicle has a transmit module, and the transmit module of the vehicle and the stationary transmit module are of the same type, and the stationary receive module is adapted to receive light of the transmit module of the vehicle. This has the advantage that with the aid of the stationary receive module and the transmit module, a redundant determination of the orientation of the vehicle is possible in the vehicle. A possible measuring error when determining the orientation is therefore able to be reduced by a mean value formation. This increases the safety.

In example embodiments, a bidirectional data transmission is able to be carried out between the vehicle and a central control with the aid of the transmit modules and receive modules. This offers the advantage that the system may be used for the communication between the control and the vehicle. Control commands are transmittable from the control to the vehicle and status information from the vehicle to the control.

Further features and aspects of example embodiments of the present invention are described in greater detail below with reference to the Figures.

DETAILED DESCRIPTION

Figure 2:
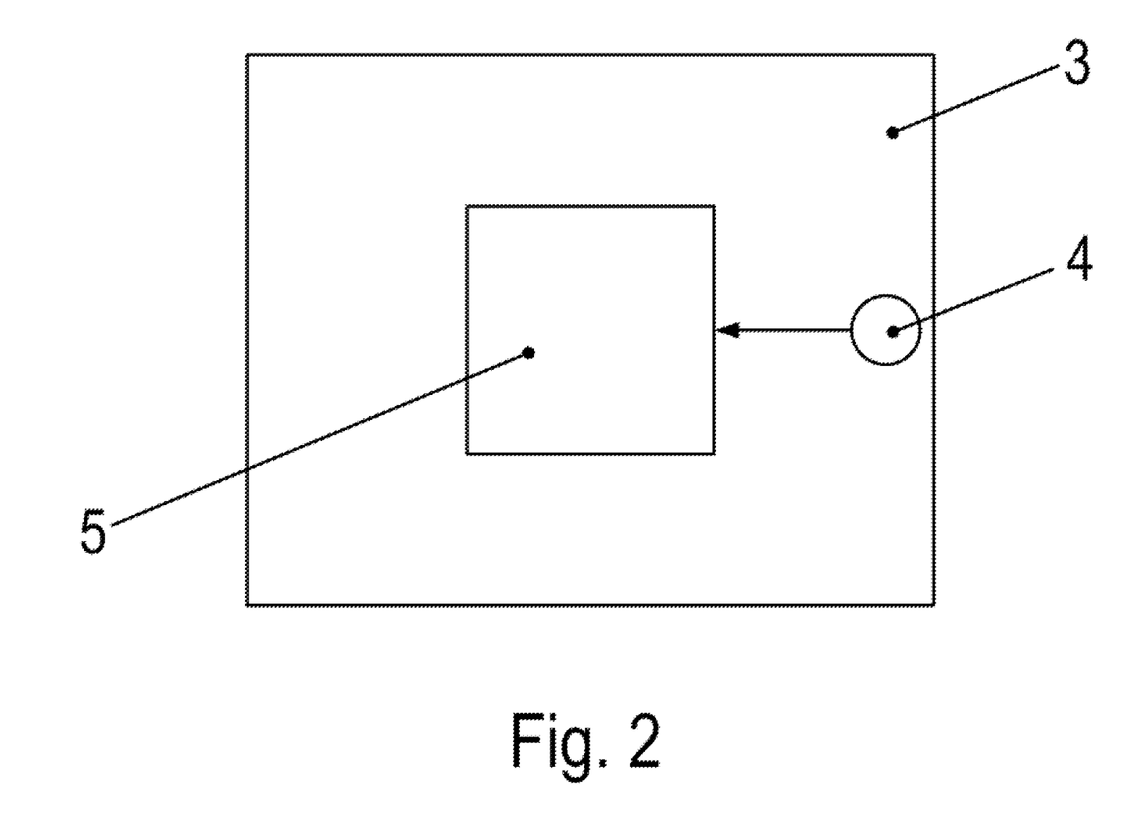
FIG. 2 shows a vehicle 3 of the system for position capture according to an example embodiment of the present invention in a plan view.

The system for position capture according to an example embodiment of the present invention has vehicle 3 and the concrete floor, and vehicle 3 is able to be driven on the concrete floor.

Figure 1:
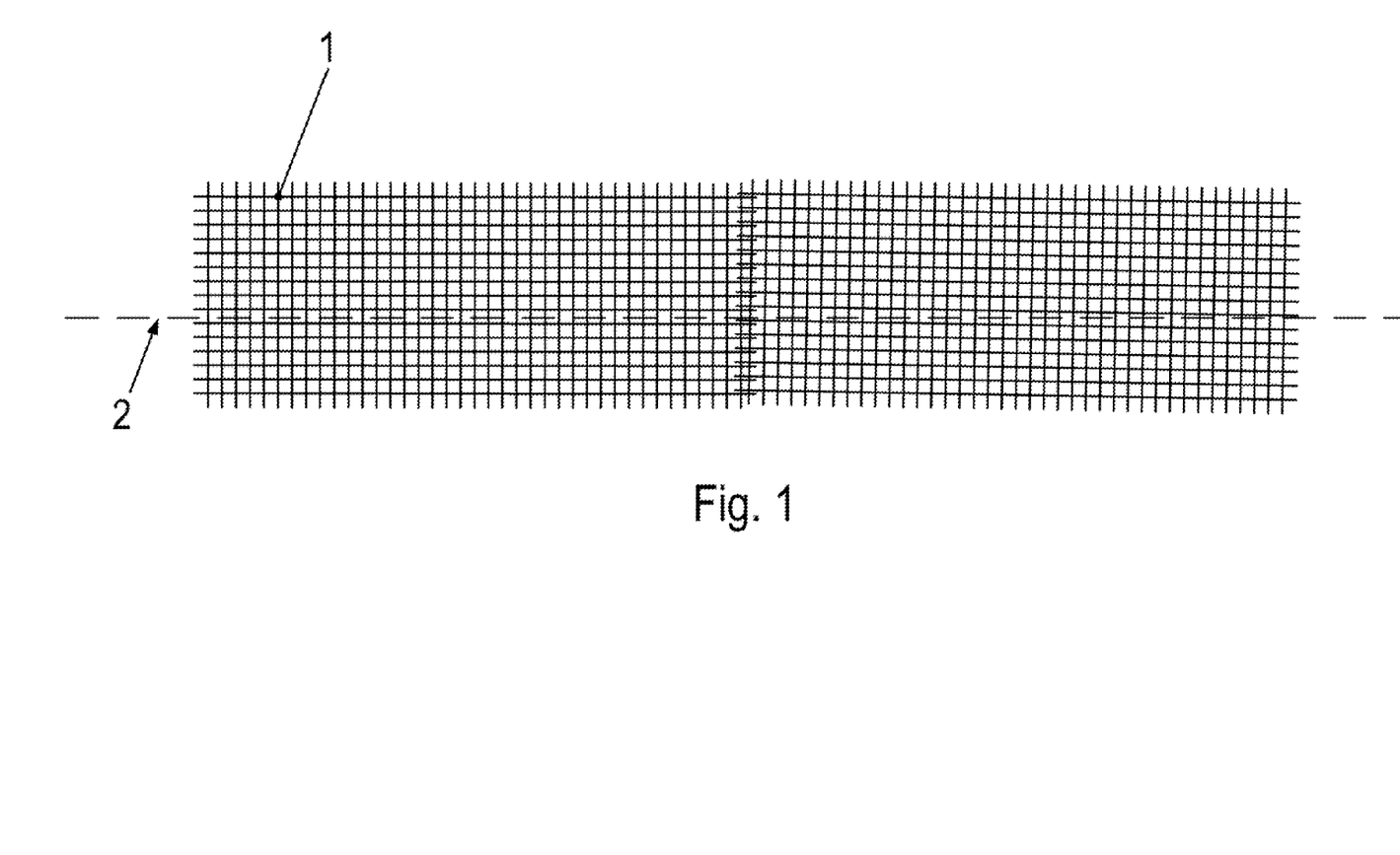
In FIG. 1, a reinforcement 1 for a concrete floor is shown in a plan view.

The concrete floor has a reinforcement 1 for armoring the concrete floor. Reinforcement 1 is metallic and has greater ductility than concrete. Reinforcement 1 may be made of steel, in particular concrete reinforcing steel. Concrete reinforcing steel bars and/or concrete reinforcing steel mesh and/or concrete reinforcing steel in rings and/or reinforcing wire and/or lattice girders may be used as reinforcement 1.

Reinforcement 1 in the concrete floor is able to be detected with the aid of a radar sensor and/or with the aid of an inductive sensor. Intensity I of the signal of reinforcement 1 is a function of the depth of reinforcement 1 in the concrete floor and of the thickness of reinforcement 1 at the location of the measurement. For example, a node of two concrete reinforcing bars causes a larger signal than a single concrete reinforcing bar.

Reinforcement 1 has a plurality of reinforcement sections, in particular reinforcing steel meshes, which are disposed next to one another and partially overlap. Two adjacent reinforcement sections may be disposed rotated by a non-vanishing angle relative to each other.

Vehicle 3 has a sensor 4, in particular an inductive sensor and/or a radar sensor, for detecting reinforcement 1 in the concrete floor. Sensor 4 may be disposed on the vehicle floor of vehicle 3 and oriented in the direction of the concrete floor. Sensor 4 is connected to an evaluation device 5, which is situated on vehicle 3.

Figure 3:
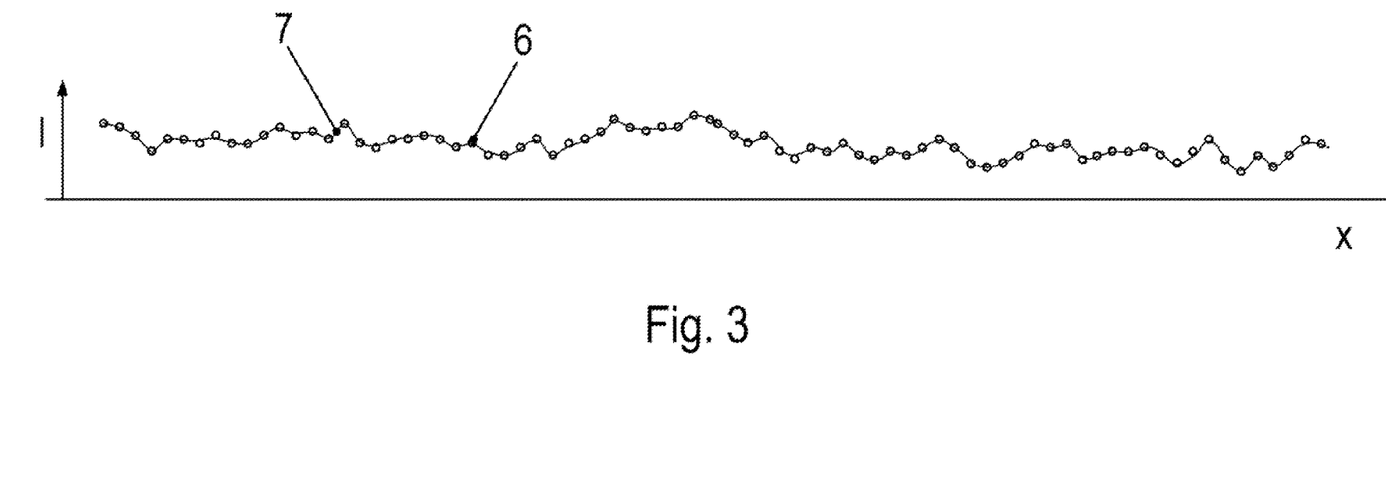
FIG. 3 shows intensity I of a measuring signal of the reinforcement in the concrete floor as a function of a position x on a driving route with the aid of measuring points 6 and a profile 7 resulting from measuring points 6.

Vehicle 3, which is driving along a driving route 2 on the concrete floor, determines the signal from reinforcement 1 as a function of the position on driving route 2 with the aid of sensor 3. Because of an irregular placement of reinforcement 1 in the concrete floor, each driving route 2 has a characteristic profile 7. This profile 7 is determined using individual measuring points 6 along driving route 2.

Figure 4:
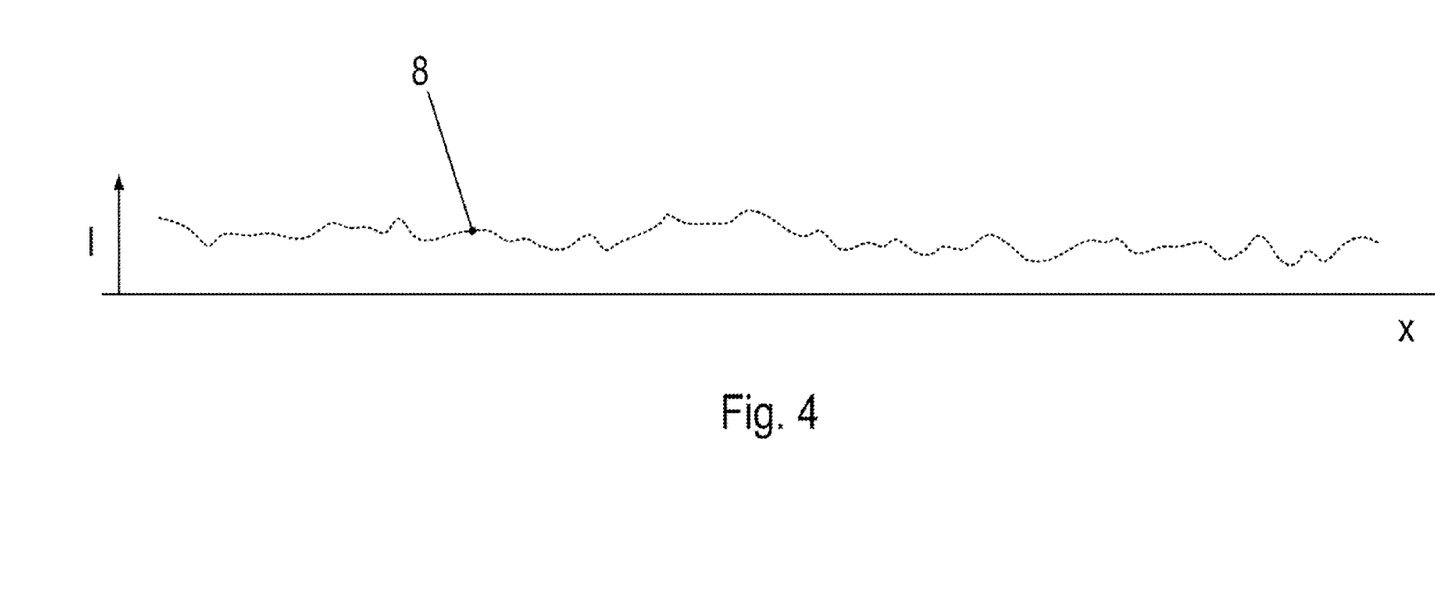
FIG. 4 shows intensity I of a reference profile 8 as a function of position x.

For the application case where vehicle 3 is meant to travel the same driving route 2 repeatedly, vehicle 3 carries out a reference drive and determines measuring points 6 along the entire driving route 2. Using measuring points 6 of the reference drive, a reference profile 8 is determined. Reference profile 8 indicates an intensity I of the signal from reinforcement 1 for each position x on the driving route.

Vehicle 3 may drive at a constant speed.

Figure 5:
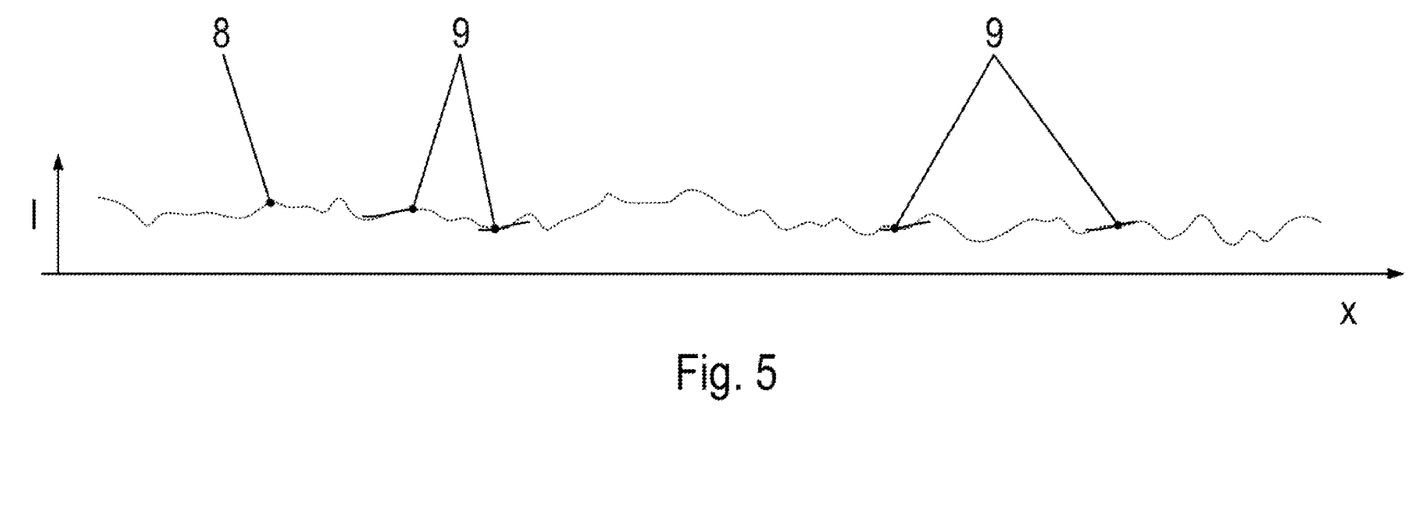
In FIG. 5, reference profile 8 and a profile segment 9 are illustrated, profile segment 9 being allocatable to different position ranges of reference profile 8.
Figure 6:
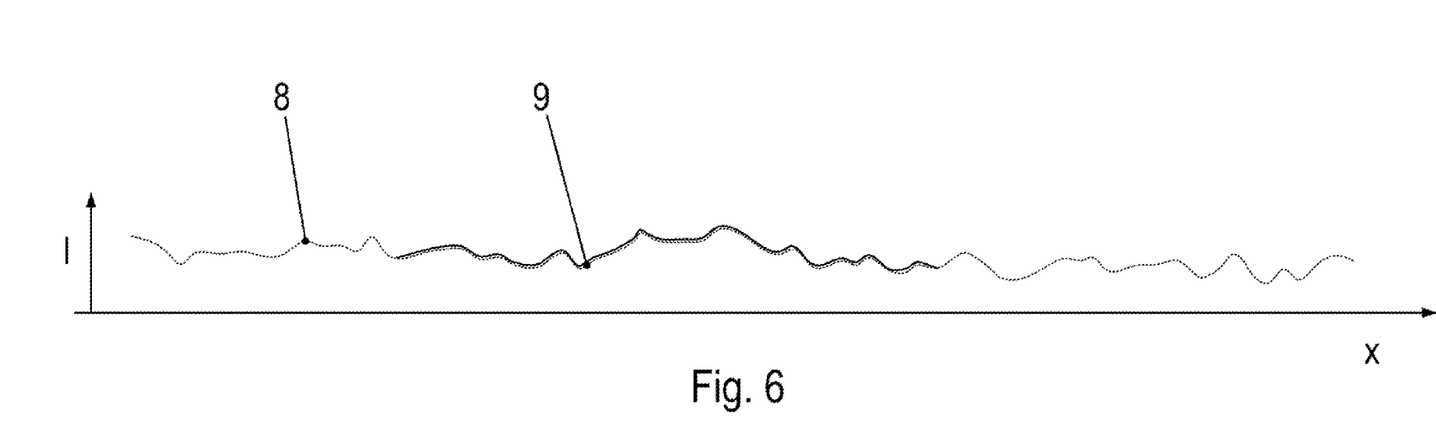
FIG. 6 shows reference profile 8 and a profile segment 9 which is uniquely, in particular biuniquely, allocated to a position range of reference profile 8.

To determine the position of vehicle 3 along driving route 2, measuring points of a profile segment 9 are determined with the aid of the sensor. Evaluation device 5 compares this profile segment 9 to reference profile 8, in particular using a correlation method. If profile segment 9 unequivocally agrees with a segment of reference profile 8, then it is possible to allocate each measuring point of profile segment 9 uniquely, in particular biuniquely, to a position on driving route 1.

The instantaneous position of vehicle 3 is determined by comparing an instantaneous measuring point with profile segment 9 and the allocated segment of reference profile 8.

If profile segment 9 has too few measuring points, then profile segment 9 is unable to be uniquely, in particular biuniquely, allocated to the reference profile. As a result, it is then also not possible to uniquely allocate a position to vehicle 3.

In example embodiments, the system has stationary transmit modules, which are disposed along driving route 2. The stationary transmit modules are situated above vehicle 3, in particular on a pole or on the topside of the interior space of a hall accommodating the system, in particular a production hall, in particular on the ceiling of the hall.

Vehicle 3 has a receive module, and the receive module may be situated on a topside of vehicle 3.

Each stationary transmit module has a transmission cone, which extends from the stationary transmit module to the concrete floor. The stationary transmit module is oriented such that the transmission cone is able to be detected by the receive module of vehicle 3.

Each stationary transmit module has a light source, in particular a light-emitting diode, a first polarization filter, a current source, and a converter. The converter is connected to a central control of a plant having the system, in particular with the aid of a data bus. The first polarization filter is disposed upstream from the light source. The first polarization filter is arranged as a linear polarization filter so that only the linearly polarized component of the unpolarized light of the light source impinging upon the first polarization filter passes through the first polarization filter.

As an alternative, the light source is arranged as a source of linearly polarized light, the first polarization filter in particular being integrated into the light source.

The control emits a control command to the converter, which controls the current source of the light source such that the light source emits modulated light. The intensity of the light is modulated. The modulated light includes the control command and an item of identity information of the stationary transmit module.

Each stationary transmit module has a respective item of identity information, which is modulated upon the light of the respective light source and transmitted. A position range on driving route 2 that is allocated to the respective transmission cone is therefore able to be allocated to vehicle 3.

The transmission cones of adjacently positioned stationary transmit modules may overlap at least partially. For example, entire driving route 2 is illuminated with the aid of the stationary transmit modules so that vehicle 3 is illuminated by light from at least one stationary transmit module at every location of driving route 2.

The light source generates visible light or infrared light.

The receive module has a light sensor, in particular a photodiode, a second polarization filter, a liquid crystal, a receiver, an evaluation device 5 and a control device for the liquid crystal.

Situated upstream from the light sensor are the liquid crystal and the second polarization filter, the second polarization filter being situated between the liquid crystal and the light sensor.

The liquid crystal is controllable by the control device such that the polarization of linearly polarized light is rotatable by 0° or 90°. Toward this end, the control device applies a voltage at the liquid crystal which aligns the molecules of the liquid crystal. Depending on the voltage applied at the liquid crystal, the polarization of the light impinging upon the liquid crystal is rotated by 0° or by 90°.

The second polarization filter is arranged as a linear polarization filter so that only the component of the linearly polarized light that has passed through the liquid crystal, which is polarized parallel to the second polarization filter, passes through the second polarization filter.

The light sensor generates a signal that is proportional to the intensity of the impinging light, in particular an electrical current, which is measured by the receiver. The receiver is connected to evaluation device 5. Using the light intensity as a function of the setting of the liquid crystal, evaluation device 5 determines the orientation of the receive module, in particular of vehicle 3, relative to the extension direction of driving route 2 in the transmission cone of the respective stationary transmit module.

Toward this end, evaluation device 5 also evaluates the identity information of the transmit module and/or the control command that is modulated onto the light.

Evaluation device 5 includes a memory module for this purpose, in which the respective identity information and the respective position range allocated to the individual identity information are stored.

The orientation of vehicle 3 on the concrete floor is denoted by an angle of rotation a. Angle of rotation a is determined relative to the extension direction of driving route 2.

Angle of rotation a between vehicle 3 and driving route 2 is determined on the basis of two measurements. During the first measurement, the linearly polarized light that passes through the liquid crystal is rotated by 90° by the liquid crystal, and during the second measurement, the light impinging upon the liquid crystal passes through the liquid crystal without rotation.

During the first measurement, the unpolarized light from the light source impinges upon the first polarization filter so that linearly polarized light passes through the first polarization filter. This light impinges upon the liquid crystal. During the first measurement, the control device controls the liquid crystal such that the polarization of the linearly polarized light is rotated by 90°. This light impinges upon the second polarization filter, but only the component of the light that is polarized parallel to the second polarization filter passes through the second polarization filter and is detected by the light sensor.

During the second measurement, the unpolarized light from the light source impinges upon the first polarization filter so that linearly polarized light passes through the first polarization filter. This light impinges upon the liquid crystal. During the second measurement, the control device controls the liquid crystal such that the polarization of the linearly polarized light is rotated by 0°. The light passes the liquid crystal without rotation during the second measurement. This light impinges upon the second polarization filter, but only the component of the light that is polarized parallel to the second polarization filter passes through the second polarization filter and is detected by the light sensor.

The angular offset a between vehicle 3 and the extension direction of driving route 2 is calculated by evaluation device 5 from intensity $I_1$ measured during the first measurement and intensity $I_2$ measured during the second measurement, according to the following relationship:

$$\alpha = \arctan\frac{I_1}{I_2}$$

Vehicle 3 has a vehicle control for controlling vehicle 3. The vehicle control is connected to evaluation device 5. Evaluation device 5 transmits the evaluated instantaneous orientation of vehicle 3 to the vehicle control, which uses the instantaneous orientation for the control of the driving direction of vehicle 3.

Vehicle 3 may be arranged as a driverless transport vehicle. The vehicle control is used for controlling the driverless transport vehicle.

The first measurement and the second measurement take place chronologically one after the other. The time span between the first measurement and the second measurement is selected to be as short as possible.

In example embodiments, vehicle 3 has both the receive module and a further transmit module. In addition to the respective stationary transmit module, a stationary receive module is installed in each case, which is oriented in the direction of the driving surface. The further transmit module is of the same type as the stationary transmit modules. The stationary receive module is of the same type as the receive module.

A bidirectional communication between vehicle 3 and the control of the plant is therefore possible with the aid of the transmit modules and receive modules. For example, the position value determined by the vehicle and/or the orientation is/are able to be transmitted to the respective stationary receive module.

Stationary receive module may be adapted to determine the orientation of vehicle 3. The control is able to compare the orientation determined by vehicle 3 and the orientation determined by the stationary receive module, so that the measuring accuracy is improved through a mean value formation.

It is therefore possible to detect a deviation of vehicle 3 from driving route 2 and to correct the driving direction of vehicle 3.

LIST OF REFERENCE CHARACTERS

1 reinforcing steel
2 driving route
3 vehicle
4 sensor
5 evaluation device
6 measuring point
7 profile
8 reference profile
9 profile segment
I intensity
X position

The invention claimed is:

1. A method for position capture of a vehicle along a driving route located on a concrete floor having a reinforcement, comprising, in order:
performing, by the vehicle, a reference drive along the driving route and recording, by the vehicle, measuring points along the driving route, each measuring point allocating a signal from the reinforcement to a position on the driving route;
determining a reference profile of the driving route based on the measuring points determined during the reference drive;
driving the vehicle along the driving route during a further drive and recording, by the vehicle, further measuring points during the further drive;
determining a profile segment from the further measuring points;
uniquely allocating the profile segment to a segment of the reference profile; and
uniquely allocating a position on the driving route to the vehicle based on the profile segment allocated to the reference profile.

2. The method according to claim 1, wherein the reference profile is determined by interpolation.

3. The method according to claim 1, wherein the profile segment is determined by interpolation.

4. The method according to claim 1, wherein the profile segment is uniquely allocated to a segment of the reference profile using a correlation method.

5. The method according to claim 1, wherein the uniquely allocating the profile to the segment of the reference profile includes determining a maximum of a correlation integral related to a correlation between the profile segment and the segment of the reference profile.

6. The method according to claim 1, wherein the uniquely allocating the position includes allocating a position range of the reference profile to the profile segment, determining a position of the vehicle relative to the profile segment, and determining the position of the vehicle on the driving route from the position range and the position of the vehicle relative to the profile segment.

7. The method according to claim 1, further comprising determining a depth, a density, and/or a thickness of the reinforcement to determine a signal from the reinforcement based on a radar measurement and/or an inductive sensor.

8. The method according to claim 1, wherein the reference profile uniquely allocates a value of a signal from the reinforcement to each position on the driving route.

9. The method according to claim 1, further comprising:
a first measurement, in which linearly polarized light of a stationary transmit module passes through a liquid crystal that is controlled such that a polarization of the light is rotated by a first angle, the light at least partially passing through a second polarization filter of the vehicle, and determining a first intensity of the light;
a second measurement, in which linearly polarized light of the stationary transmit module passes through the liquid crystal that is controlled such that the polarization of the light is rotated by a second angle, the light at least partially passing through the second polarization filter, and determining a second intensity of the light; and
determining, based on the first and second intensities, determine an orientation of the vehicle relative to an extension direction of the driving route;
wherein the first angle and the second angle are unequal.

10. The method according to claim 9, wherein the first angle and the second angle differ by 90° in absolute amount and/or differ by a value of between 80° and 100° in absolute amount.

11. A system, comprising:
a concrete floor having a reinforcement;
a vehicle adapted to travel on the concrete floor along a driving route on the concrete floor, the vehicle including a sensor adapted to measure a signal from the reinforcement and an evaluation device;
wherein the system is adapted to perform the method recited in claim 1.

12. The system according to claim 11, wherein the sensor is arranged on a vehicle floor of the vehicle, is connected to the evaluation device, and/or is electrically connected to the evaluation device.

13. The system according to claim 11, wherein the sensor includes a radar sensor and/or an inductive sensor adapted to determine a thickness, a density, and/or a depth of the reinforcement in the concrete floor.

14. The system according to claim 11, wherein the vehicle includes a vehicle control connected to the evaluation device.

15. The system according to claim 14, wherein the vehicle is arranged as a driverless transport vehicle.

16. The system according to claim 11, further comprising stationary transmit modules arranged along the driving route, the vehicle including a receive module, each transmit module including a light source and a first polarization filter arranged as a linear polarization filter so that linearly polarized light is emitted by the transmit module, the receive module including a light sensor, a liquid crystal, a control device for the liquid crystal, and a second polarization filter arranged as a linear polarization filter and located between the light sensor and the liquid crystal, the control device adapted to control the liquid crystal so that a polarization of the linearly polarized light that passes through the liquid crystal is rotated by a first angle or by a second angle, the first angle and the second angle being unequal, the light sensor adapted to detect light from the light source, which has passed through the first polarization filter, then through the liquid crystal and then through the second polarization filter.

17. The system according to claim 16, wherein the stationary transmit modules are arranged above the vehicle, the receive module is arranged on a top side of the vehicle, the light source includes a light emitting diode, the first angle is 0°, and the second angle is 90°.

18. The system according to claim 16, wherein the light source is adapted to generate intensity-modulated light and/or the light includes visible and/or infrared light.

19. The system according to claim 16, wherein the light source is adapted to generate intensity-modulate light with a frequency between 100 kHz and 10 MHz.

20. The system according to claim 16, wherein the receive module includes a receiver connected to the evaluation device and adapted to measure a signal from the light sensor, the evaluation device adapted to determine an orientation of the vehicle relative to an extension direction of the driving route based on two measured values of the light sensor.

21. The system according to claim 14, wherein the vehicle control is adapted to control the vehicle based on an orientation of the vehicle determined by the evaluation device.

22. The system according to claim 20, wherein the signal includes a current.

23. The system according to claim 16, wherein each stationary transmit module includes identity information modulatable onto the light of the respective stationary transmit module, a position range along the driving route uniquely allocatable to each stationary transmit module with the aid of the identity information.

24. The system according to claim 23, further comprising a memory unit adapted to store respective position ranges, allocated to the respective identity information, the evaluation device adapted to read out the respective position ranges, allocated to the respective identity information, stored in the memory unit.

25. The system according to claim 16, wherein each stationary transmit module has an individual transmit cone, the transmit cones of adjacent stationary transmit modules partially overlapping, and/or an entire driving route is illuminated with the aid of the stationary transmit modules as an illumination of the driving route (2).

26. The system according to claim 16, further comprising a stationary receive module allocated to the respective stationary transmit module, the stationary receive module and the receive module of the vehicle being of the same type, the vehicle including a transmit module, the transmit module of the vehicle and the stationary transmit module being of the same type, the stationary receive module adapted to receive light from the transmit module of the vehicle.

27. The system according to claim 26, wherein the transmit modules and the receive modules are adapted to perform a bidirectional data transmission between the vehicle and a central control.

28. A system, comprising:
a vehicle adapted to travel on a concrete floor along a driving route on the concrete floor, the vehicle including an evaluation device and a sensor adapted to measure a signal from a reinforcement arranged in the concrete floor;
wherein the system is adapted to perform the method recited in claim 1.

* * * * *